Sept. 28, 1954    P. W. SENFLEBEN    2,689,964
MACHINE FOR PULLING UPPERS
Filed Oct. 12, 1951    7 Sheets-Sheet 1

Inventor
Paul W. Senfleben
By his Attorney
Thomas J. Ryan

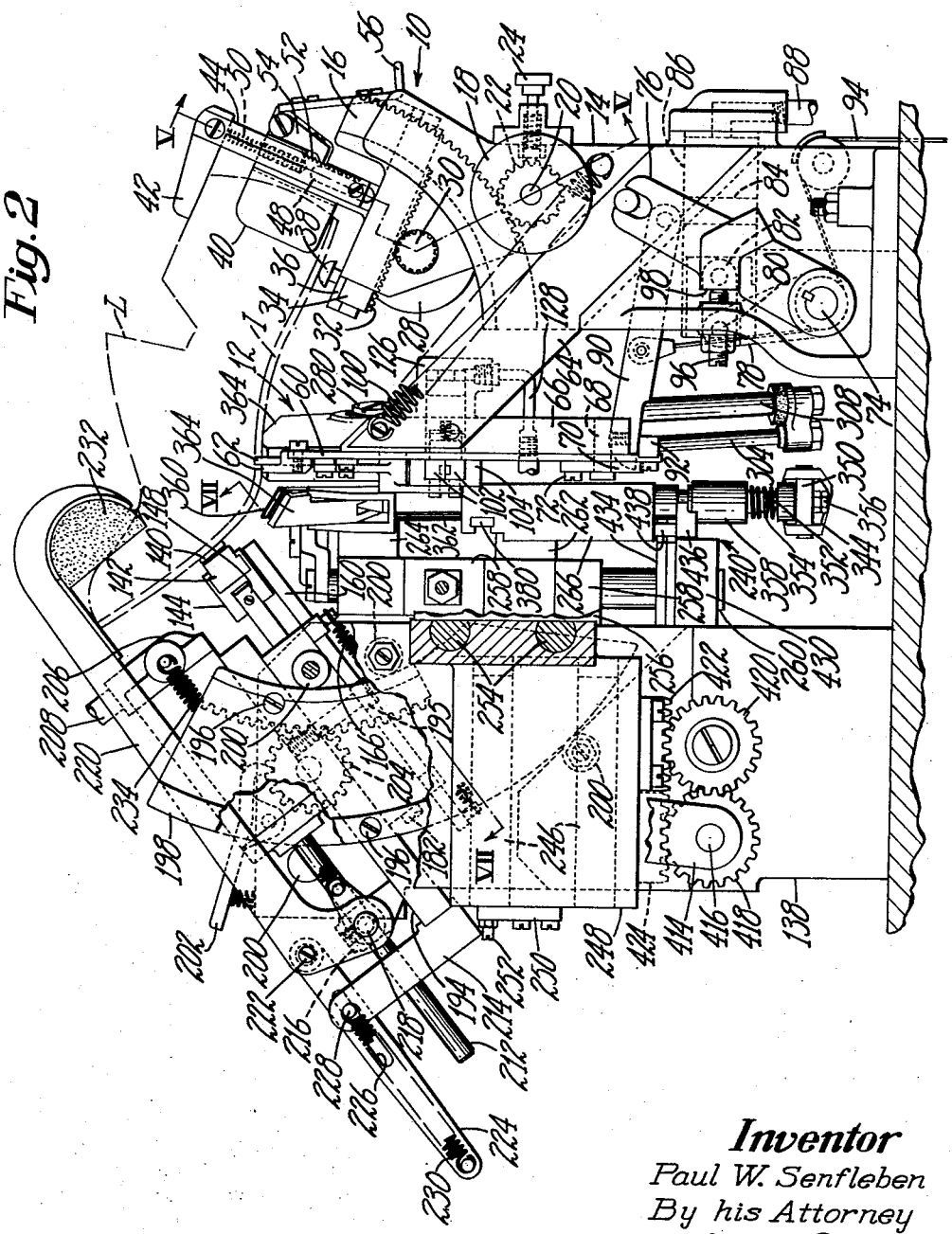

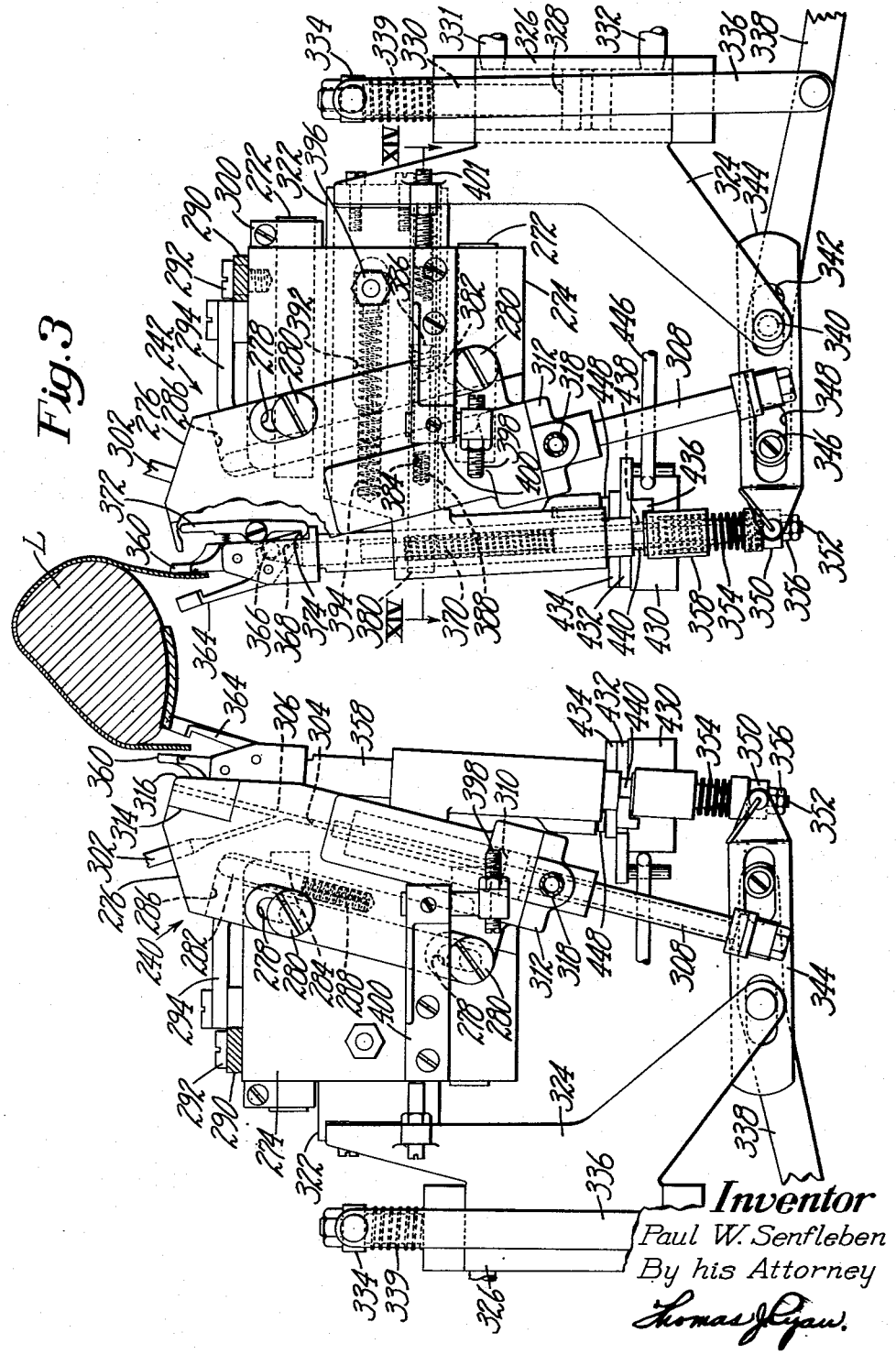

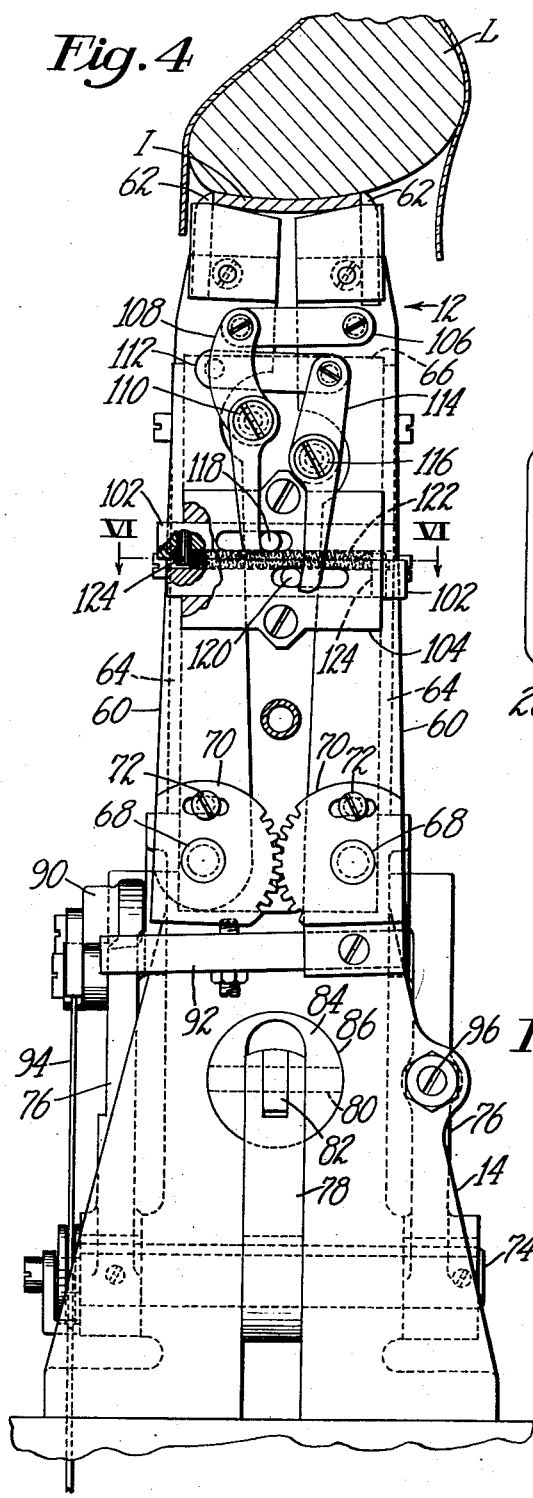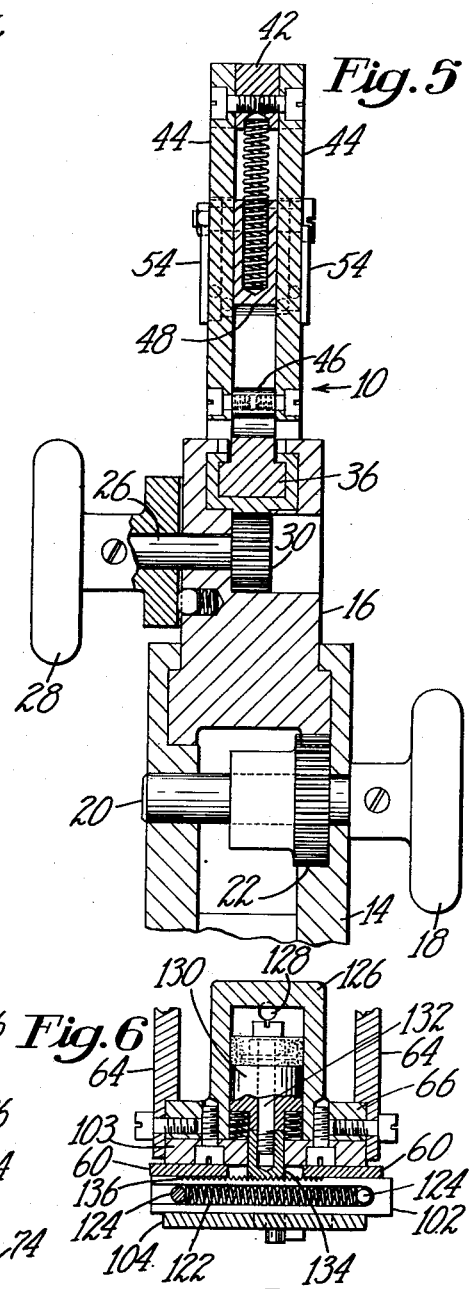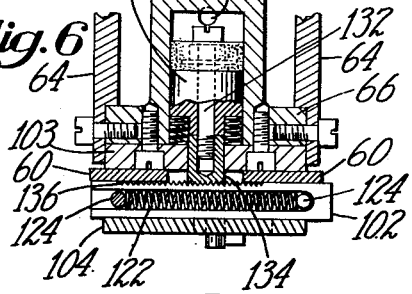

Sept. 28, 1954  P. W. SENFLEBEN  2,689,964
MACHINE FOR PULLING UPPERS
Filed Oct. 12, 1951  7 Sheets-Sheet 5
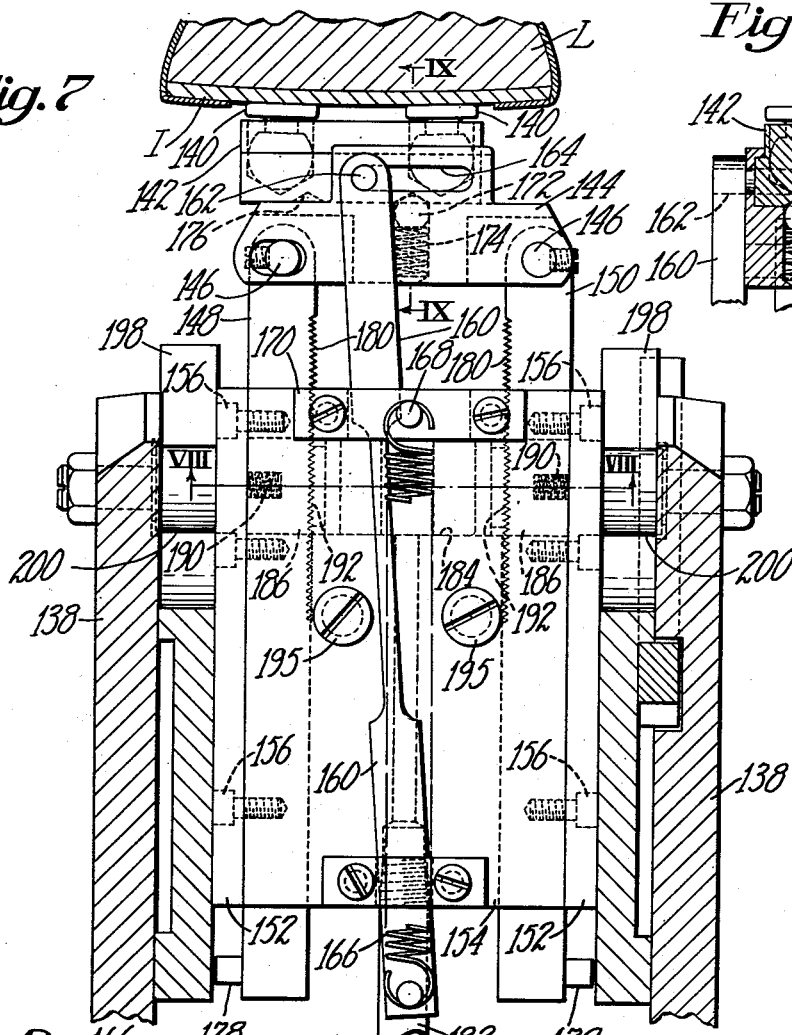
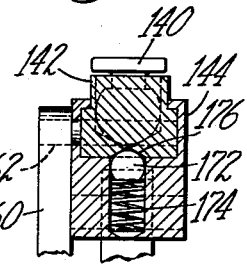
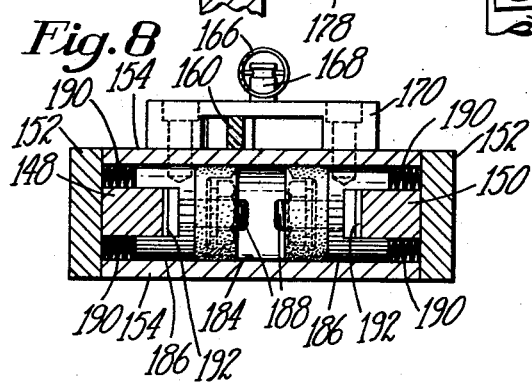
*Inventor*
Paul W. Senfleben
By his Attorney
Thomas J. Ryan

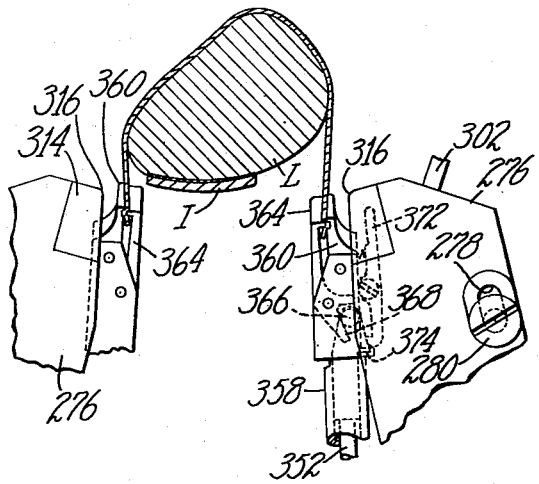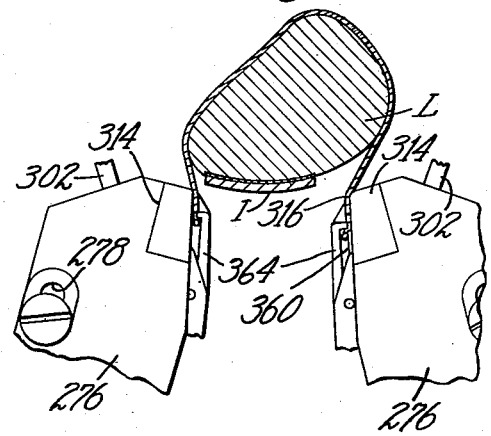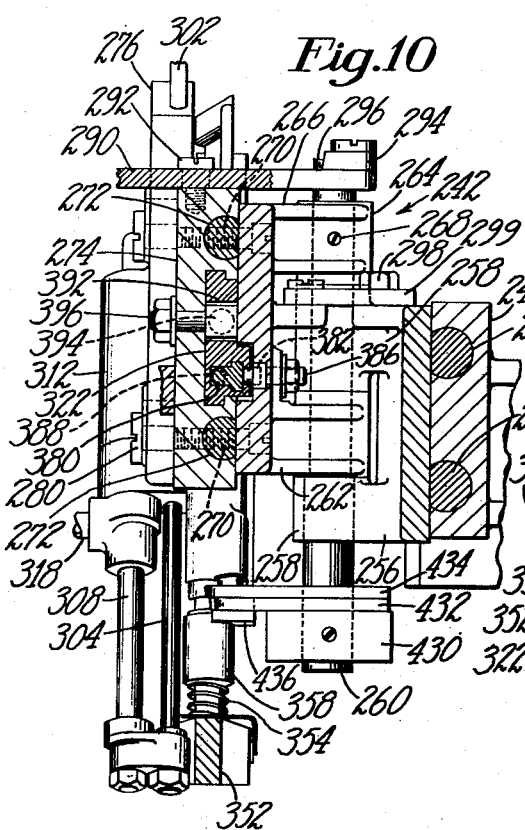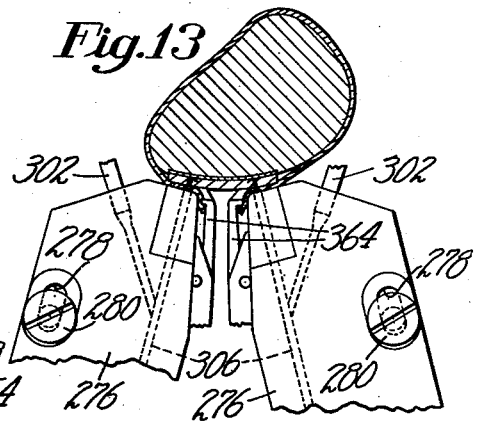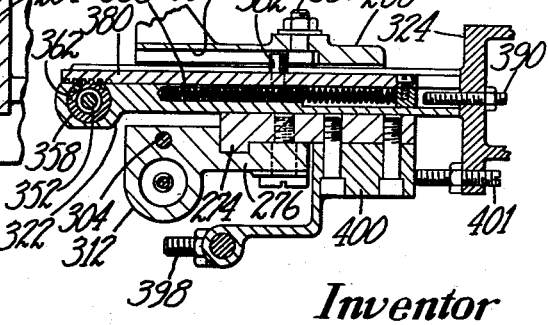

Sept. 28, 1954  P. W. SENFLEBEN  2,689,964
MACHINE FOR PULLING UPPERS
Filed Oct. 12, 1951  7 Sheets-Sheet 7

*Inventor*
Paul W. Senfleben
By his Attorney
Thomas J Ryan

Patented Sept. 28, 1954

2,689,964

UNITED STATES PATENT OFFICE 2,689,964

MACHINE FOR PULLING UPPERS

Paul W. Senfleben, Malden, Mass., assignor to United Shoe Machinery Corporation, Flemington, N. J., a corporation of New Jersey Application October 12, 1951, Serial No. 250,969

14 Claims. (Cl. 12—10.4)

This inventon relates to machines for working shoe uppers over lasts and is more particularly concerned with machines for pulling uppers over lasts. The invention is herein illustrated and described as embodied in a machine which, by way of example, is organized to provide for operation on portions of a previously pulled-over shoe upper immediately at the rear of the ball line, but it will be recognized that utility of the invention is not so restricted, and that in its several aspects the invention may well be useful when operating upon other portions of a shoe.

In the manufacture of welt, McKay-sewed, and other types of shoes, the usual practice, after the pulling-over machine has effected initial association of the forepart of the upper with its last and insole, is to present the shoe to the operator of a side-lasting machine. He thereupon makes a preliminary inspection to check the relation of the assembled parts to the lines of the last and mounts the inverted shoe on a spindle. Frequently, at the rear of the ball line where the sides of the last and the edge of the insole curve inwardly toward the shank, the side laster first prefers manually to pull the upper by hand pincers to conform it to the last across the instep and then to draw the upper close to the inwardly curved shoulders formed by the sides of the last, first at one side and thereafter at the other side. After driving tacks to fasten the upper in those locations, the side-laster is ready to last the sides of the shoe by machine.

If the pulling force, applied to the upper as above described, be misdirected or be too great or too small, upper distortion results, and the danger of this is increased when the upper is thus pulled and fastened first at one side and thereafter at the other side. The present invention accordingly provides a machine for pulling the upper at both sides simultaneously, with provision for adequate control of the direction and the force of the pull. The invention, as herein exemplified, is partially predicated on the premise that the operator should, for best results, have adequate opportunity to observe the tip line, throat and adjacent upper portions during the pulling operation, and the construction shown is therefore such that the shoe is positioned bottom downward with the upper conveniently within view of the operator.

An important object of the invention is to provide improved means for positioning the shoe accurately with respect to the operating instrumentalities. To this end a feature of the invention resides in the provision of means for accurately positioning both widthwise and heightwise the portion of the shoe to be operated on by engagement with the opposite edge portions of the insole and automatic mechanism for limiting, as determined by such positioning means, the inward movement of devices provided for wiping the margin of the upper inwardly over the insole and for driving tacks to fasten the upper. As illustrated, the positioning means thus provided comprises side gages which are retracted from the shoe only after the latter has been clamped in the position thus determined, the clamping means comprising members which engage the bottom of the forepart of the insole in locations spaced apart widthwise of the shoe and assume positions determined by the shoe, after which they are locked in the positions thus determined.

The above and other features of the invention, together with various novel details of construction and combinations of parts, will now be more fully described in connection with an illustrative machine and with reference to the accompanying drawings thereof. In the drawings, Fig. 1 is a plan view of the upper and operative portions of an exemplary machine embodying the invention;

Fig. 2 is a view in side elevation of the head portion of the machine, a part being broken away and a portion being in section as indicated by the line II—II of Fig. 1, and showing the shoe positioning means in operative relation to a shoe;

Fig. 3 is an elevation of the right and left lasting units seen in Fig. 1, each being viewed along a direction indicated by the arrows III—III of that figure;

Fig. 4 shows on a larger scale the positioning gages and associated operating parts seen in Figs. 1 and 2 and as viewed from the rear, a portion being in section;

Fig. 5 is a section on the irregular line V—V of Fig. 2 showing in elevation details of the heel rest and associated adjusting means;

Fig. 6 is a section on the line VI—VI of Fig. 4 showing in plan parts of the wiper-tacker stop means;

Fig. 7 is a section on the line VII—VII of Fig. 2 showing presser feet and air-controlled mechanism for locking them in depressed condition;

Fig. 8 is a section on the line VIII—VIII of Fig. 7 as viewed from below;

Fig. 9 is a section on the line IX—IX of Fig. 7 showing the presser foot mounting;

Fig. 10 is a section taken on the line X—X of

Figure 1:
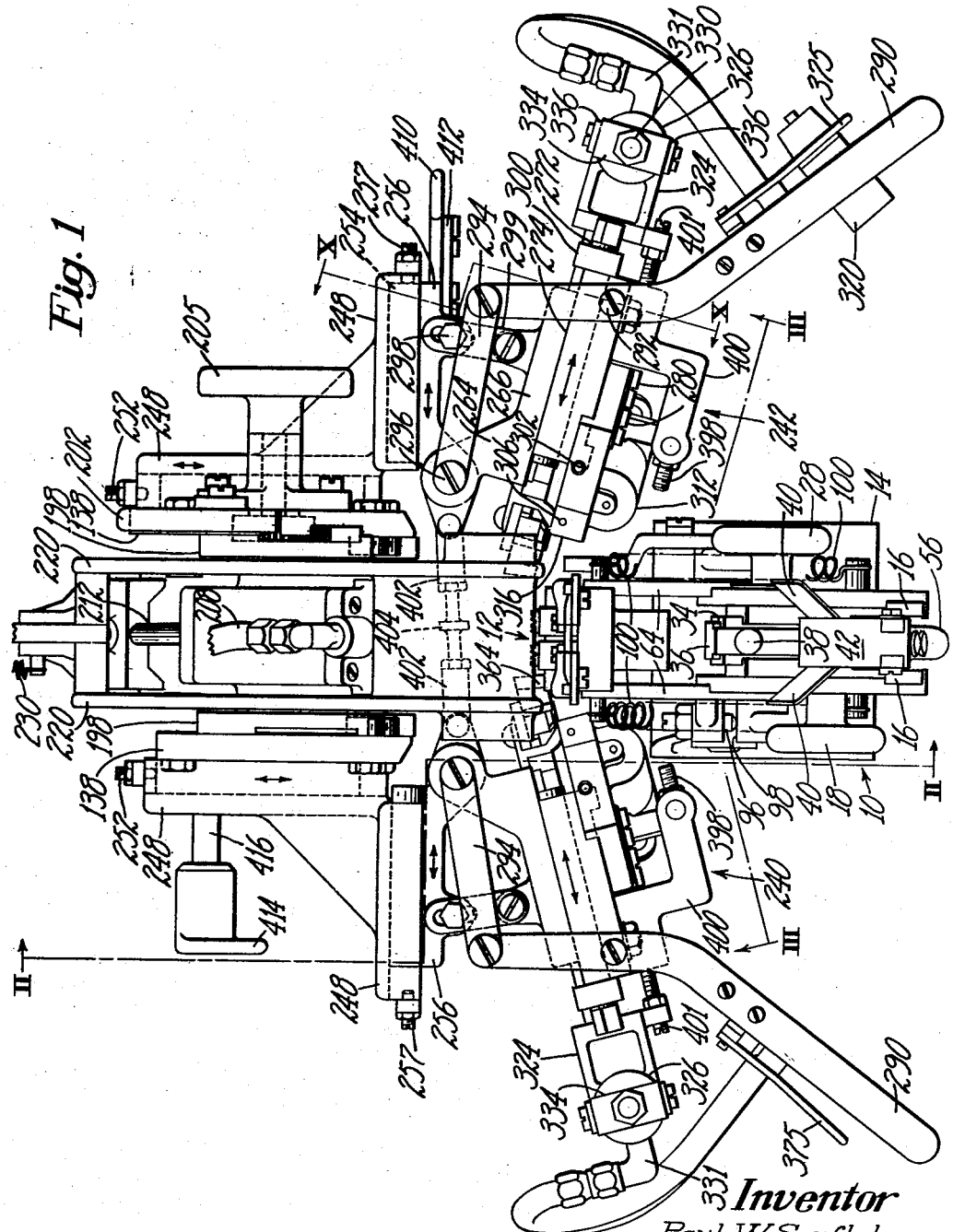
Figure 15:
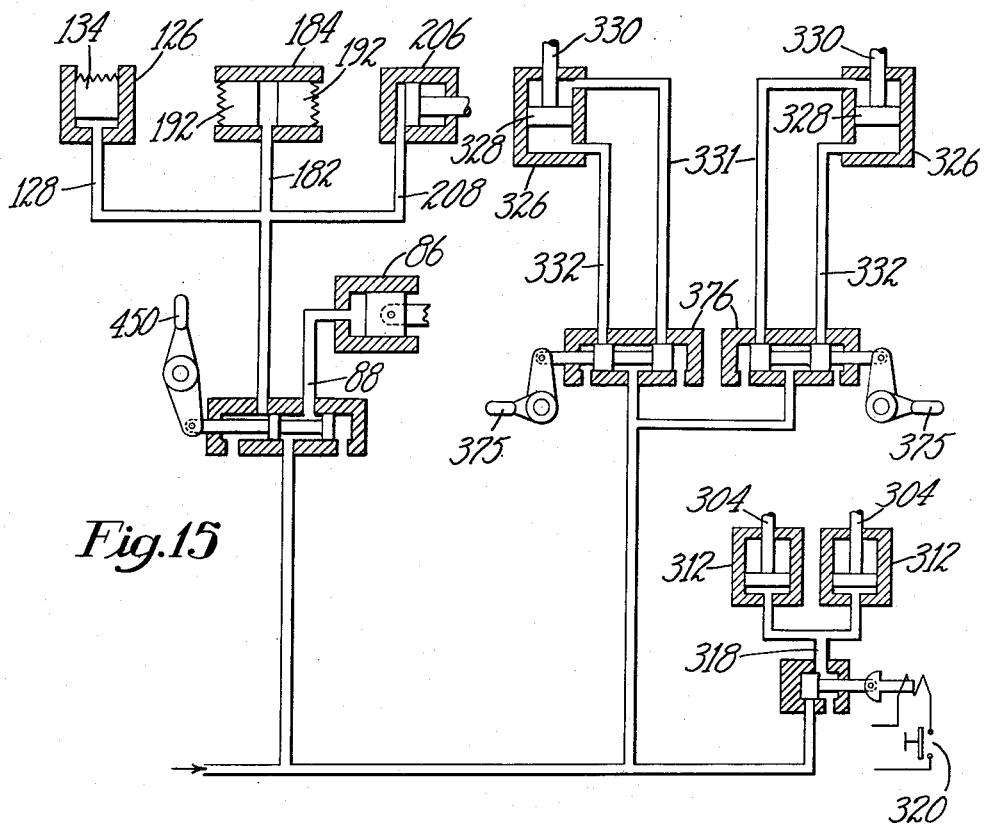

Fig. 1 showing the slide mountings of grippers and of wiper-tackers;

Figs. 11, 12 and 13 are views corresponding with a portion of Fig. 3 but showing the pulling over units in successive stages of their operation on a shoe;

Fig. 14 is a section taken on the line XIV—XIV of Fig. 3 clarifying mechanism for turning the gripper jaws;

Fig. 15 is a schematic diagram of the pneumatic control system; and

Figure 16:
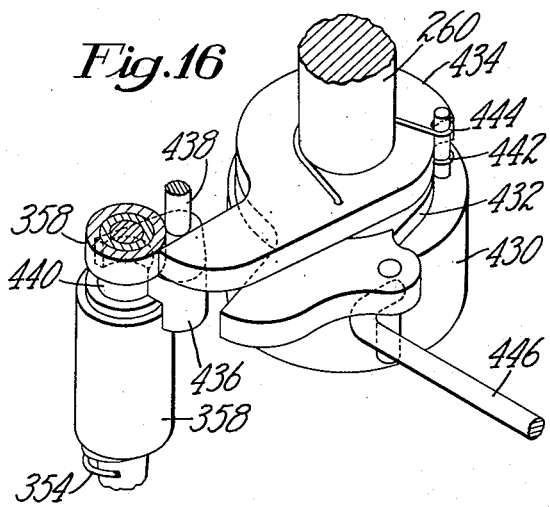

Fig. 16 is a perspective of parts seen in Fig. 3 for adjustably fixing the initial positions heightwise of the gripper jaws.

In the illustrative machine the shoe to be operated on is inclined but generally bottom downward with its heel portion nearest the operator and is to have its upper immediately at the rear of the ball line pulled downwardly over the sides of the last and preferably in a direction normal to the face of the insole in that locality. Accordingly, the machine herein shown comprises initial shoe supporting means including an adjustable heel rest generally designated 10 (Figs. 1 and 2) and a retractable insole gaging device generally designated 12 operative at a fixed height and to be hereinafter further described. An upright frame member 14 bolted to the front of the machine supports both the heel rest 10 and the gaging device 12. For adjusting the heel rest heightwise a gear sector 16 (Figs. 2 and 5) is slidably mounted in ways formed in opposite sides of the member 14. A hand wheel 18 secured on a shaft 20 rotatably mounted in the member 14 may be turned to rotate a pinion 22 affixed on the shaft 20 and in mesh with the teeth formed on the sector 16, thereby lowering or elevating the latter as may be desired for a range of heel heights. A spring-pressed plunger 24 is slidably mounted in a bore formed in the member 14 and is biased to extend into a space between consecutive teeth on the pinion 22 to lock the heel rest in a selected heightwise position. For adjusting the heel rest lengthwise to accommodate different shoe sizes the gear sector 16 rotatably receives a shaft 26 on which is secured a hand wheel 28 and a pinion 30, the latter being in mesh with teeth 32 formed on the flat bottom of a carriage 34. This carriage is slidably anchored in a T-shaped kerf in the sector 16, and the carriage 34 itself is formed to provide a T-slot mounting for a member 36. The member 36, by means such as a set screw (not shown), is adjustably locked lengthwise relative to the carriage 34 to afford a convenient way of quickly changing the machine to accommodate large sizes instead of small, and vice versa. A button 38 affixed to the member 36 is arranged to abut centrally the heel portion of an insole I carried by a last L without interfering with unlasted margins of the upper in that area. A V-shaped portion 40 of the member 36 is disposed to contact opposite sides of the heel end of the upper. For a purpose later explained manually operable means is provided for holding down the heel portion of the shoes and last resting on the button 38, said means comprising a latch 42 adapted to engage the heel cone top, a pair of arms 44 respectively affixed on opposite sides of the latch 42, and a pin 46 supported by screws respectively inserted in depending ends of the arms 44. The pin 46 is engageable with opposite sides of a slot 48 formed in the member 36 and extending heightwise of the last. The latch 42 is manually depressible against resistance of a compression spring 50 seated in a bore formed in the upper end of the member 36. Lower portions of the arms 44 are provided with teeth 52. Spring-pressed pawls 54 pivotally mounted on opposite sides of the member 36 are respectively urged to mesh with the teeth 52 to lock the latch 42 when depressed for contact with the top of the heel cone. An arm 56 mounted on the member 36 is so disposed that on being moved upwardly by hand to engage corresponding upper ends of the pawls 54, the latter are pivoted to release the arms 44 to the upward influence of the spring 50 which raises the latch 42 from its locked position.

The gaging device 12 by means of which the insole I is to be centered widthwise throughout its heel end portion comprises two side gages 60 formed to engage the bottom face of the insole adjacent to its edge heelwardly of the ball line, each gage 60 having a vertical projection 62 for engaging an edge face of the insole. Slidably mounted in inclined guideways formed in the respective outer sides of the member 14 are parallel slides 64, their upper ends being bridged by a vertically extending member 66 (Figs. 2 and 4). The respective gages 60 are pivotally supported at their lower ends on pins 68 mounted in the member 66. For equalizing widthwise movements of the gages 60 toward each other, there are respectively mounted on the pins 68 meshing gear segments 70, the latter being adjustably secured to the gages by means of bolts 72 which respectively extend through slots formed in the segments. The gages 60 are actuated widthwise and are retractable from their upper and operative level by means under control of the operator as will be explained.

A rockshaft 74 journaled in the member 14 has fixedly mounted thereon a pair of levers 76, the upper ends of which have pin and slot connection with the slides 64. To rotate the shaft 74 counterclockwise (as seen in Fig. 2) a lever 78 keyed thereon is connected by a pin 80 to a link 82, the latter having connection with a piston 84 pneumatically displaced (to the left in Fig. 2) by compressed air normally admitted directly to a cylinder 86 via a conduit 88. The gages 60 are accordingly normally held in their upper and operative positions. A lever 90 fulcrumed at one end to a lever 76 has its other end supported by engagement with a bar 92 affixed to one of the segments 70. Accordingly depression of a treadle (not shown) is effective through connection of a cable 94 with the lever 90 to move the projections 62 toward one another to the extent permitted by opposite edges of an insole engaged thereby. Displacement of the piston 84 in one direction to determine the desired operative level of the projections 62 is adjustably limited by a stop screw 96 threaded into a rib of the member 14 and arranged to abut a flat face 98 formed on one of the levers 76. A tension spring 100 (Fig. 1) yieldingly resists elevation of the gages 60 and, when pneumatic pressure in the cylinder 86 is relieved as is hereinafter described, is effective to retract them to a lower inoperative position.

For a purpose later explained means is provided for causing the widthwise positions of the projections 62 at their operative level to correspondingly position a pair of stops 102. A spacer 103 (Fig. 6) is secured to a member 66 and the stops 102 are transversely slidable in a groove formed in a U-shaped bracket 104 screwed to the spacer 103.

A link 106 (Fig. 4) pivotally connects the upper end of one gage 60 with an upper arm of a bell crank lever 108 pivotally supported by a pin 110 affixed in the member 66, and similarly a link 112 pivotally connects the upper end of the other gage 60 with an upper arm of a bell crank lever 114 pivotally supported by a pin 116 affixed to the member 66. Lower ends of the respective levers 108, 114 engage studs 118, 120 mounted in the stops 102, respectively, the studs projecting through slots formed in the bracket 104. The studs 118, 120 are maintained in contact with the bell crank levers 108, 114 respectively by means of a compression spring 122 seated in a groove formed in the stops 102 and having opposite ends abutting pins 124, 124 which are respectively affixed to the stops 102. A portion of the member 66 serves as a cylinder 126 (Fig. 6) to which compressed air is conducted by a tube 128. A piston 130 in the cylinder 126 is connected by a piston rod 132 to a detent 134, the latter being arranged to move through a bore formed in the spacer 103 for locking engagement with, or disengagement from, teeth 136 formed on the stops 102, respectively.

Floatingly arranged with respect to a rearward frame portion 138 and in a location to engage the bottom forepart of the insole I, when initially positioned by the mechanism above described, is a pair of presser feet 140 each having ball and socket mounting in a block 142 (Figs. 7 and 9). The latter is movable widthwise of the machine and of a shoe bottom, being manually slidable in a slot formed in a second block 144. Ears formed on opposite ends of the block 144 support pins 146 from which arms 148, 150 are respectively suspended. As best shown in Fig. 8, the arms 148, 150 are received by, and are independently movable heightwise in, a rectangular casing comprising end plates 152, 152 and side members 154, 154 secured thereto by screws 156 (Fig. 7). The presser feet 140 are yieldingly supported heightwise by means of a lever 160 the upper end of which is connected by a pin 162 to the block 142, the pin 162 extending through a horizontal slot 164 in the block 144. The lower end of the lever 160 has pin connection with a tension spring 166 supported by a pin 168 projecting from a bridging member 170 that is secured to one of the members 154 and serves to restrain movements of the lever 160 within limits while guiding its upward thrust. A ball 172 acted on by a spring 174 seated in a bore formed centrally in the block 144 is adapted to rest in either of two widthwise spaced recesses 176 in the bottom of the block 142, thereby adjustably locating the presser feet 140 widthwise as desired with respect to a right or left shoe to assure its stability during operation of the machine. Lugs 178 projecting from the arms 148, 150 respectively act as stops to limit upward movement of the presser feet by the spring 166.

In order properly to fix the heightwise positions of the depressed presser feet 140 when a shoe has been placed thereon in the position determined by the gages 60, the arms 148, 150 are respectively provided with teeth 180. Air under pressure may be conducted by a tube 182 (Figs. 7 and 8) to a cylindrical chamber 184 extending widthwise between the members 154. Arranged in the chamber 184 for independent widthwise movements together and apart is a pair of opposed piston-like detents 186 respectively having rods 188 threaded to receive nuts for securing packing seals and washers. Outer ends of the detents 186 are respectively provided with shallow slots for seating individual return springs 190, and with deep slots for accommodating the arms 148, 150 respectively, the bottoms of the deep slots having teeth 192 adapted to mesh with the teeth 180 and thereby lock the arms 148, 150.

Means is provided for cooperating with the presser feet 140 when in locked condition so as to clamp the toe portion of a positioned shoe against movement during the ball-pulling. For this purpose a plate 194 (Fig. 2), to which one of the members 154 is affixed by screws 195, is secured by screws 196 to gear sectors 198, 198 arranged side to side, the latter being respectively mounted for contact with four rollers 200 supported by the frame 138. A spring-presed pawl 202 pivotally mounted on the frame 138 normally engages consecutive teeth on a pinion 204 journaled in the frame 138 and meshing with teeth of one of the gear sectors 198, thereby preventing rotation of the latter. With the pawl 202 and pinion 204 out of mesh the presser feet 140 and toe clamping means about to be described may jointly be swung by means of a hand wheel 205 (Fig. 1) journaled in the frame 138 for adjustment heightwise as desired for a given range of shoe styles or toe spring. Affixed to the plate 194 is a cylinder 206 to which fluid pressure is conducted via a tube 208 to actuate a piston (not shown) and a piston rod 212 connected thereto, the rod slidably extending through a bore in an upturned lower end portion 214 of the plate 194. A spacer block 216 fixedly mounted on the rod 212 is pivotally connected by pins 218, 218 to corresponding shorter arms of a pair of parallel bell crank levers 220. A pivot 222 on which the levers 220 are fulcrumed also pivotally supports an end of an arm 224 having a slot 226. The portion 214 is bifurcated to support a pin 228 slidable in the slot 226. On downward movement of the piston rod 212 a tension spring 230 affixed to the pin 228 and to the lower end of the arm 224 causes a cushion toe pad 232 supported by the levers 220 first to be swung over a positioned shoe and then yieldingly to bear downward on its toe portion. The action commences with the levers 220 extending upward and away from the shoe. As the rod 212 is depressed the pad 232 is swung above the toe, the spring 230 urging the arm 224 and the levers 220 upward until the pin 228 is engaged by the bottom of the slot 226. Since further clockwise turning of the levers 220 (as viewed in Fig. 2) cannot occur and the pad 232 is then over the toe, further depression of the rod 212 results in the pad yieldingly clamping the toe against the resistance of the spring 230 and against resistance of tension springs 234 which, upon subsequent reduction of the operating pressure, are sufficiently strong to raise the pad 232 to an out-of-the-way position where it cannot interfere with the positioning of the next shoe.

Similar pulling over units, generally designated 240, 242 are, in the present disclosure, located adjacent to the side gages 60, respectively, when elevated. Both units comprise gripper mechanism and wiper-tacker elements together with their manual and pneumatic controls as will be described. Since the units 240, 242 are alike and similarly mounted it will suffice if their description be limited for the most part to the arrangement and construction of unit 242, corresponding parts of the units bearing like reference characters.

The rearward frame portion 138 (Fig. 2) has formed thereon a pair of longitudinal and cylindrical guideways 246, 246 which accommodate bearings formed in a slide 248. A bracket 250 bolted to the slide 248 adjustably receives a set screw 252 which by engagement with one of said bearings serves to limit movement of the slide 248 heelward. A pair of cylindrical guideways formed in the slide 248 extend transversely of the machine to receive bearings 254, 254 secured to a slide 256. Transverse movement of the slide 256 is adjustably limited in an outward direction by means of a set screw 257 threaded into the outer end of the slide 248. The slide 256, as best seen in Figs. 2 and 10, has a pair of alined arms 258 which are vertically bored rotatably to receive a pivot stud 260. Mounted for rotation about the vertical axis of said stud 260 are two arms 262, 264 (the arm 262 bearing on an upper surface of the arm 258) of a bracket 266 for supporting the gripper and wiper-tacker operating elements to be described, the bracket 266 and its instrumentalities thereby being mounted for movement in space, within limits, as desired.

A set screw 268 (Fig. 10) adjustably secures the arm 264 heightwise to the stud 260 and is also for adjustably fixing the angularity of the bracket 266 with respect to a positioned shoe. Bolts 270, 270 (Fig. 10) affixed in the bracket 266 secure, respectively, parallel bearings 272, 272 on which is mounted a slide 274 movable widthwise of a shoe in the machine, the slide normally being movable toward and from that portion of the last located heelwardly of the ball line near the beginning of the shank portion. A combination wiper-tacker 276 inclined upwardly and inwardly toward the shoe bottom is provided with a pair of parallel slots 278 (Fig. 3) through which shoulder bolts 280 respectively extend to secure the wiper-tacker to the slide 274 and against movement, except yieldingly heightwise of the shoe within the range permitted by said slots 278. A plunger 282 (Fig. 3) is nested within the upper portion of a groove 284 formed in the slide 274 and abuts a shoulder 286 of the wiper tacker 276 to urge the latter upwardly by reason of engagement of the lower end of said plunger with a compression spring 288 also seated in the groove 284.

For moving the wiper-tacker 276 to and from operating position a manual control lever 290 is pivotally connected by a bolt 292 to the top of the slide 274 and has an extremity movably fulcrumed on one end of a link 294, the other end of the link being pivotally connected by a bolt 296 to the upper end of the stud 260. It will be noted that angularity of the slide 274 with respect to the slide 256 (Fig. 1) normally remains fixed for a shoe style but it may be changed by adjusting a bolt 298 in relation to a slotted link 299 connecting the slide 256 and the bracket 266 for the slide 274. Such angularity, when increased, provides for inward wiping of the upper stock more from the heelward portions of a shoe and this may be particularly desirable, at least on one side of some styles of shoes, and when the foreparts of a given style appear, for example, to be scant and unyielding. Outward movement of the slide 274 from the shoe is limited by a stop collar 300 (Figs. 1 and 3) affixed to one of the bearings 272.

A conduit 302 is adapted to deliver a tack headfirst by gravity to the upper end or head of a driver 304 operative in a bore 306 formed in the wiper-tacker 276. The driver 304 has an enlarged lower end fixedly coupled to a piston rod 308. The latter extends upwardly for connection with a piston 310 slidable in a cylinder 312 integral with the wiper-tacker 276. The delivery end of the bore 306 extends through a wiper insert 314 having a rounded snubbing corner 316 suitably adapted to engage an upper. To drive a tack through the bore 306 as it emerges from the wiper insert 314 point-up and adjacent to the corner 316, air pressure is admitted to the cylinder 312 via a tube 318, an air admission valve (not shown) being controlled by a solenoid switch 320 (Fig. 1) conveniently mounted on the lever 290.

For supporting gripper mechanism about to be described a slide 322 is movably mounted in a T-shaped guideway formed in the slide 274. A vertically disposed bracket 324 bolted to the outer end of the slide 322 supports a cylinder 326 in which a piston 328 (Fig. 3) is mounted to drive a piston rod 330 vertically as determined by the differential in air pressure admitted to opposite sides of the piston 328 by tubes 331 and 332. A crosshead 334 secured on the piston rod 330 pivotally supports at opposite ends a pair of depending arms 336 that are pivotally connected to a lever 338. For reasons later explained ends of a compression spring 339 respectively abut the head 334 and the top of the cylinder 326. The outer portion of the lever 338 forms a handle by which manual control of the gripper movement may be exercised if desired. A depending portion of the bracket 324 supports a pivot pin 340 on which the lever 338 is fulcrumed, the pin 340 also extending through a slot 342 in a link 344. The inner end of the lever 338 carries a pin 346 slidable within a slot 348 formed in the link 344, and the latter is forked to pivotally support a collar 350 slidable on a gripper control rod 352. The collar is cupped to receive a compression spring 354 surrounding the rod 352 and urging the collar against a stop nut 356 threaded on the rod 352, the upper end of the spring 354 abutting a shoulder formed within the lower, enlarged tubular end of a sleeve 358. To the upper end of the sleeve 358 a pincer jaw 360 is firmly affixed, the sleeve itself rotatably extending in a bore formed in the slide 322 and having several circumferential teeth 362 (Figs. 2 and 14) arranged longitudinally of the sleeve for a purpose later explained. A jaw 364 pivotally mounted in a yoke secured to the upper end of the sleeve 358 is arranged and adapted to cooperate with the jaw 360 in gripping and releasing upper stock. For actuating the jaw 364 a roller 366 (Fig. 10) carried by the upper end of the gripper control rod 352 is arranged to engage a curved cam surface 368 formed on a lower side of the jaw 364. One end of a compression spring 370 surrounding the rod 352 abuts a shoulder thereof and the other end abuts a shoulder formed internally of the sleeve 358, the effect being a tendency to close the jaws 360, 364 by reason of the downward cam action of the roller 366 on the surface 368. Such closure may be prevented by a spring pressed pawl 372 pivotally mounted on the jaw 360 and biased to latch a shoulder 374 of the rod 352 so that the latter is in raised position with respect to the sleeve 358. The pawl 372 may be easily unlatched manually when the stock is to be gripped and then, if desired, admission of pneumatic pressure to the cylinder 326 via tube 332 to control the jaws 360, 364 for gripping and upper pulling may be had by actuating a lever 375 mounted on the lever 290 and controlling a two-way valve 376 (Fig. 15). Release of the lever 375 is effective to cause opening of the jaws 360, 364 by reversing said two-way valve so as to admit pressure via the tube 331.

In the exemplary machine the jaws 360, 364 may be permitted freely to rotate about the longitudinal axis of the sleeve 358 according to the influence exerted on them by the upper stock being tensioned, or if desired for certain types of work the following described means may be employed to turn the jaws jointly to some extent as they are moved inwardly of a shoe bottom. A rack 380 (Figs. 3, 10 and 14) slidable in a slot formed in the slide 322, is provided with teeth on a forward face arranged to mesh with the teeth 362. Widthwise movement of the slide 322 relatively to the rack 380 effects turning of the sleeve 358 on its axis. Such widthwise movement outwardly is limited by a pin 382 (Fig. 14) secured to the rack 380 and projecting into a horizontal slot 384 in the bracket 266 for abutment with a square headed bolt 386 which is secured to the bracket 266. One end of a compression spring 388 is seated against one end of a slot in the slide 322, the other end of the spring abutting a detachable block-shaped end of the rack that is slidable in said slot, said end being removed if free turning of the jaws is desired. A stop screw 390 (Fig. 14) carried by the bracket 324 is effective upon engagement with the block-shaped end to limit widthwise movement of the rack 380 relatively to the slide 322 and so stops further turning of the jaws 360, 364.

In order yieldingly to cause advance of the gripper jaws 360, 364 inwardly of the shoe ahead of the wiper-tacker unit 276 the slide 322 is provided with a horizontal slot 392 in which a spring 394 is nested, one end of said spring abutting the inner end of the slot 392 and the other end abutting a squared shank of a bolt 396 that is secured to the slide 274, said shank portion being adapted to slide in the slot 392 relatively to the slide 322. Inward widthwise movement of the wiper-tacker unit 276 relatively to the positioned shoe bottom is positively limited by engagement of the stop 102, when retracted and locked in widthwise position corresponding with the projection 62 of the insole gage as above noted, with an end of a set screw 398 adjustably threaded into a bracket 400 mounted on the slide 274. A set screw 401 threaded into the bracket 324 engages the bracket 400 and adjustably limits the initial inward advance of the jaws 360, 364 relatively to the wiper-tacker 276 to assure sufficient space in which to arrange satisfactory initial gripping of the upper stock.

Since the ball line of a shoe bottom is oppositely inclined with respect to its longitudinal heel-part median line for a right and for a left shoe, and since there normally is more upper stock free of last contact and available for pulling over on the inside of either a right or left shoe, two further adjusting mechanisms are provided in the illustrative machine. For appropriately shifting both pulling over units 240, 242 widthwise at the same time, ears of their respective upper arms 258, 258 are pivotally connected to the outer ends of a link 402 (Fig. 1) the inner portions of the latter being threaded and connected by a nut 404 for adjustment widthwise in turn-buckle fashion. A vertical hand lever 410 (Fig. 1) having its lower end pivotally connected to one side of the machine frame is connected by a link 412 to one slide 256 and enables an operator simultaneously to shift the units 240, 242 widthwise. For longitudinal adjustment of these units a vertical hand lever 414 (Figs. 1 and 2) on the other side of the machine is secured to a shaft 416 rotatably journaled in the frame portions 138 and carrying a pinion 418. The pinion 418 meshes with a pinion 420 arranged to engage the teeth of a rack 422 secured to the left-hand slide 248. The shaft 416 also supports a pinion (not shown) arranged to mesh with the teeth of a rack 424 secured to the other slide 248. Accordingly, movement of the lever 414 in one direction is effective to shift one slide 248 and its associated pulling over unit heelward as the other slide 248 and its associated pulling over unit is shifted toeward, and vice versa.

Duplicate means are provided for adjustably limiting heightwise the initial positions of the two sets of jaws 360, 364 according to whether rights or lefts are to be pulled over. For this purpose a collar 430 is made fast to the lower end of each stud 260. Rotatably mounted on the stud above the collar 430 are spacers 432, 434 respectively having ears which, in one rotative position may overlap. The ear of the spacer 432 may be positioned in engagement with the upper face of a lug 436 which is otherwise engaged by the spacer 434. The lug 436 projects from a pin 438 freely slidable in and projecting downwardly from the slide 322, and extends into a groove 440 formed in the sleeve 358. The ears of the spacers 432, 434 are urged by springs 442, 444 (Fig. 16), respectively, against the sleeve 358, but the ear of 432 may be held away from the lug by a rod 446 secured to the machine frame. If spacer 432 is permitted to engage the top of the lug 436 the sleeve 358 and its gripper jaws will be lowered against resistance of the spring 354 and relatively to the slide 322, but if spacer 434 alone engages the top of the lug 436 the sleeve and its jaws will be in higher initial position. An adjusting screw 448 (Fig. 3) is provided in a heightwise bore formed in the slide 322 to engage the spacer 434 and thereby to limit initial upward movement of the gripper jaw assembly.

In operating the machine a shoe mounted on its last L is first positioned therein by being placed with the heel portion of its insole I contacting the button 38 and the heel of the upper abutting the portion 40. The forepart of the shoe is depressed in contact with the presser feet 140, manually adjusted widthwise for a right or left shoe, until further downward movement is prevented by the elevated side gages 60 engaging the bottom face of the insole, said gages being held at upper operative level by air pressure normally present in the cylinder 86. Next the cable 94 is actuated by treadle to cause the projections 62 to center the heelward portion of the shoe widthwise as above explained, the treadle being released after the stops 102 have thus been positioned widthwise. It will be noted that the presser feet 140 are free to assume such heightwise positions as the shoe bottom then imposes upon them. The latch 42 is manually depressed to engage the top of the heel cone of the last. The next step is to lock the shoe as positioned in the machine in readiness for ball pulling, the operator simply throwing a single valve-control lever 450 (Fig. 15). After thus shifting the controlled spool valve to the left, from the position shown in Fig. 15, the results are:

(1) to relieve air pressure to the tube 88, and consequently in the cylinder 86, permitting the springs 100 to retract the gaging device 12 to a lower and out-of-the-way position; (2) to admit air to the tube 128 whereby the stops 102, in being lowered, become locked in widthwise positions corresponding with the projections 62 when contacting the insole edges; (3) to admit air via the tube 182 whereby the presser feet 140 are locked to support the insole I as positioned by the elevated gages 60; and (4) to admit air via the tube 208 whereby the toe pad 232 is swung over the shoe toe and then yieldingly pulled downwardly to clamp the toe against the presser feet 140. The first three results just mentioned occur almost immediately, but the valve timing is such as to assure that retraction of the gages 60 occurs after results (2) and (3). The toe clamping becomes effective after the presser feet 140 have been locked by reason of the time elapsing during the swinging movement of the levers 220 above the toe. The latch 42 guards against the shoe being pivoted on the presser feet 140 by the toe-clamping action of the pad 232.

With the shoe locked in bottom down position an operator may readily inspect the upper stock and its fit on the last before grasping the control levers 338 or 290, one in each hand, to move the sets of jaws 360, 364, if desired, into approximate operating position immediately heelward of the ball line. As illustrated in Fig. 3 and as above explained, the spacer plates 432, 434 are employed adjustably to fix the initial heightwise positions desired for the jaws 360, 364. This will assure that the pair of jaws 360, 364 about to grip the inside upper stock may be closed in an initial heightwise position generally below that of the other pair of cooperating jaws, thereby assuring that sufficient margins will be available for pulling and fastening in the ball-line area.

Being satisfied as to the initial relationship of upper, last and gripping means, the operator closes both sets of jaws 360, 364 on the stock, as indicated in Fig. 11, by manually releasing the latches 372 from the shoulders 374, respectively, and actuates the levers 375 to admit air pressure to the lower sides of the pistons 328. They are moved upward to force the gripper control rods 352 downward, thereby tensioning the stock by the pull of the cooperating jaws 360, 364. He then swings the levers 290, one with each hand, to move both slides 274 farther toward the shoe. In so doing, the bolt 396 carried by the slide 274 yieldingly advances the slide 322 inwardly by acting on the spring 394 thereby yieldingly advancing the closed jaws 360, 364 ahead of the adjacent wiper-tacker unit 276 until resistance of the upper to further tensioning will not further compress the spring 394. The wiper-tacker unit will then move together with the jaws inwardly and upwardly under the shoe bottom, the snubbing corners 316, 316 commencing to engage the stock, as shown in Fig. 12, and preparatory to wiping the stock inwardly, as shown in Fig. 12. During the wiper action over the insole the jaws 360, 364 may slip off the margin of the upper, but if they do not, the operator may cause them to open at the desired time by reversing movement of the levers 375 to admit pressure via the tubes 331. It will be noted that the spring 339 functions both to limit downward movement of the associated piston 328 and to avoid excessive play heightwise between the parts surrounding the gripper control rod 352.

The extent of inward wiping movement permitted will be automatically limited by the engagement of the inner ends of the stops 398, respectively, with the locked and lowered stops 102. After the inward wipe the operator closes the switch 320 causing the drivers 304, respectively, to drive tacks already in their bores 306 upwardly and into opposite upper and insole margins just rearward of the ball line. The switch 320 also causes a tack separator (not shown) to deliver head downward into each of the tack tubes 302 a tack which will be ready for insertion in the next shoe to be ball pulled in the machine. In successively progressing from the conditions indicated in Fig. 11 to those shown in Fig. 12 and then to the final stage seen in Fig. 13, it will be noted that the sets of gripper jaws 360, 364 operate quite independently of their adjacent wiper-tacker units 276 but they together move inwardly of the shoe. Upon reversing the valve-control lever 450, i. e., shifting its valve back to the position shown in Fig. 15 and urging the arm 56 upward to release the latch 42, the ball-pulled shoe may be removed from the machine.

Having thus described my invention, what I claim as new and desire to secure by Letters Patent of the United States is:

1. A machine for working an upper over a last comprising gripper and wiper-tacker units respectively movable inwardly widthwise of the last for operation on opposite marginal portions of the upper, means engageable in the vicinity of said units with the adjacent edge portions of an insole carried by the last initially to position the insole widthwise and heightwise, mechanism for retracting said insole positioning means from operative position, and toe-clamping means operative after said positioning means is retracted for holding the last in its established position, said insole positioning means determining the limits of inward movement of the gripper and wiper-tacker units.

2. A machine for working an upper over a last comprising gripper and wiper-tacker units respectively movable inwardly widthwise of the last for operation on opposite marginal portions of the upper, a heel rest, means engageable in the vicinity of said units with the adjacent edge portions of an insole carried by the last and cooperative with said heel rest initially to position the last widthwise and heightwise, mechanism for retracting said insole positioning means from operative position, and toe-clamping means cooperative with the heel rest after said positioning means is retracted for holding the last in its established position, said insole positioning means determining the limits of inward movement of the gripper and wiper-tacker units.

3. A machine for working an upper over a last comprising grippers for tensioning opposite side portions of the upper, wiper-tacker units respectively movable inwardly widthwise of the last for operation on marginal portions of the upper, a heel rest, means engageable in the vicinity of said units with the adjacent edge portions of an insole carried by the last and cooperative with the heel rest initially to position the last widthwise and heightwise, mechanism for moving said insole positioning means from operative position, and toe-clamping members cooperative with the heel rest after said positioning means is removed for holding the last in its established position, said insole positioning means determining the limits of inward movement of the wiper-tacker units.

4. A machine for working an upper over a last comprising gripper jaws, wiper-tacker units respectively movable inwardly widthwise of the last and adjacent to said jaws in operating on opposite marginal portions of the upper, means for adjustably limiting the inward movements of said units, means for supporting the last heightwise between said units, portions of said supporting means being arranged to position the last widthwise by engagement with the side edges of an insole carried by the last, said portions being movable widthwise of the last to engage the side edges of the insole, and mechanism operative to lock said limiting means in positions corresponding to those of said portions when engaging the insole.

5. A machine for working an upper over a last comprising gripper and wiper-tacker units respectively movable inwardly widthwise of the last in operating on opposite marginal portions of the upper, means for adjustably limiting the inward movements of said units, a heel rest, retractable members cooperative with the heel rest for positioning the last widthwise by engagement with the side edges of an insole carried by the last, said members being movable widthwise of the last to engage the side edges of the insole, and mechanism operative upon retraction of said positioning members for locking said limiting means in positions corresponding to those of said members when engaging the insole.

6. A machine for operating on a shoe mounted on a last in bottom-down position comprising a pair of pulling-over units movable heightwise and widthwise of the shoe at opposite sides of the shoe, a rest for supporting the heel end of the shoe during the operation, means cooperative with said rest for positioning the last by engagement with an insole thereon, said means including retractable edge gages movable heightwise and widthwise of the last and arranged initially to support the forepart of the insole and last in position for the operation of the pulling-over units on the upper, toe clamping members operative upon retraction of the gages to hold the forepart of the last as positioned, mechanism for retracting said gages, and stops respectively actuated by widthwise movements of said gages to adjustably limit movement of said units widthwise of the shoe.

7. A machine for operating on shoes in bottom-down positions comprising a heel rest adapted to abut both the bottom of an insole carried by a last and counter portions of an upper thereon, a pair of side gages spaced widthwise initially to position and support in heightwise position that portion of the insole immediately heelward of the ball line, said gages being retractable from their operative level wherein said insole portion is substantially horizontal, and means cooperative with the heel rest for supporting and holding the forepart of the shoe in the position established by the gages before their retraction, said means including a toe-clamping member automatically actuated in time relation to the retraction of said gages.

8. A machine for operating on shoes comprising a pair of side gages spaced widthwise and movable heightwise initially to position and support that portion of an insole immediately heelward of the ball line of a last by which said sole is carried, means for retracting the side gages from the insole, and toe-clamping members for supporting and holding the forepart of the shoe in the position first established by the gages prior to their retraction, said members being automatically actuated in time relation to the retraction of said gages.

9. A machine for ball pulling the upper of a shoe in bottom-down position on a last carrying an insole, comprising a heel rest, a pair of retractable side gages relatively movable widthwise of the insole and cooperative with the ball area edges of the insole and said rest initially to position the shoe heightwise and widthwise, power means for normally maintaining said gages raised to operative level, members arranged to engage and support the forepart of the shoe in the position established by said gages, wiper-tacker units mounted for operative movement adjacent to the elevated gages respectively, stops mounted for widthwise movements corresponding to those of the gages and arranged to limit inward movements of said units with respect to the positioned shoe bottom, and control means automatically effective when said power means is ineffective on the gages for locking said members and stops in operative positions.

10. A machine for operating on a shoe mounted on a last carrying an insole and in bottom-down position comprising a pair of pulling-over units respectively operable on opposite marginal upper stock in the ball area, a heel rest for positioning the shoe against heelward movement, retractable means cooperative with the heel rest and the ball area of the insole edges for initially positioning the shoe heightwise relatively to said pulling-over units, presser feet yieldingly mounted for engagement with the insole bottom toeward of its ball area, and means for locking the presser feet against movement heightwise of the shoe in the insole engaging positions determined by the retractable means before the latter is retracted.

11. A machine for operating on a shoe mounted on a last carrying an insole and in bottom-down position comprising a pair of pulling-over units respectively operable on opposite marginal upper stock to be fastened to the insole in the ball area, a heel rest for positioning the shoe against heelward movement, gages movable heightwise and widthwise of the shoe for engaging the bottom and edge faces of the insole in its ball area, said heel rest and gages cooperating initially to position the shoe with respect to said units, depressible feet arranged to assume positions determined by contact with the bottom forepart of the positioned shoe, means for retracting said gages to clear the ball area for operation of said units, mechanism for locking said feet in their depressed positions, and toe clamping means arranged and adapted to cooperate with said locked feet to clamp and hold the shoe upon retraction of said gages.

12. A machine for ball pulling a shoe upper over a last carrying an insole comprising a heel rest, a pair of side gages movable heightwise and widthwise of the shoe and arranged to support the ball area of the insole, means for moving said gages toward and from selected operative locations to position the shoe cooperatively with said rest, pulling-over units respectively arranged adjacent to the side gages and movable inwardly of the positioned ball area when said gages are removed therefrom, a pair of presser feet disposed widthwise of the forepart of the shoe and yieldingly mounted for movement in directions heightwise of the shoe to assume positions determined by the positioned shoe, and means for locking said presser feet in those positions.

13. A machine for ball pulling a shoe upper over a last carrying an insole comprising a heel rest, a pair of side gages movable heightwise and widthwise of the shoe and arranged to support the ball area of the insole while engaging the edge face of the insole, a pair of stops movable widthwise of the shoe to limiting positions corresponding with the insole edge face engagements of said gages, means for moving the gages heightwise of the shoe to position the shoe cooperatively with said heel rest, pulling-over units movable inwardly of the positioned ball area when said gages are removed therefrom, said stops being respectively arranged to limit such inward movements of the units, a pair of presser feet disposed widthwise of the forepart of the shoe and yieldable heightwise of the shoe to assume positions imposed by the positioned shoe, means for locking the stops and presser feet respectively in their imposed widthwise and heightwise positions, and a member cooperative with the presser feet to clamp the toe portion of the positioned shoe.

14. A machine for working an upper over a last comprising gripper and wiper-tacker units respectively movable inwardly widthwise of the last in its ball area for operation on opposite marginal portions of the upper, means engageable in the vicinity of said units with the adjacent edge portions of an insole carried by the last initially to position the insole widthwise and heightwise, mechanism for retracting said insole-positioning means from operative position, and toe-clamping means operative after said insole-positioning means is retracted for holding the last in its established position during operation of said units.

References Cited in the file of this patent

UNITED STATES PATENTS

| Number | Name | Date |
|---|---|---|
| 1,118,965 | Stewart | Dec. 1, 1914 |
| 2,033,245 | Jorgensen | Mar. 10, 1936 |